Dec. 6, 1966     D. W. THOMAS     3,290,598

MICROWAVE ANECHOIC CHAMBER

Filed Sept. 28, 1964     2 Sheets-Sheet 1

INVENTOR.
DAVID W. THOMAS
BY C.E. Vautrain Jr. AGENT

Q. Baxter Warner
ATTORNEY

United States Patent Office 3,290,598
Patented Dec. 6, 1966

3,290,598
MICROWAVE ANECHOIC CHAMBER
David W. Thomas, 66 Hillview, Ventura, Calif.
Filed Sept. 28, 1964, Ser. No. 399,945
11 Claims. (Cl. 325—67)

The invention described herein may be manufactured and used by or for the Government of the United States of America for governmental purposes within the payment of any royalties thereon or therefor.

This invention relates in general to microwave absorption devices and more particularly to an improved microwave anechoic chamber which, among other distinguishing features, permits positioning a transmitter or transmitters at various bearing angles with respect to a receiver without significant change in the absorption of reflected energy.

Conventional anechoic chambers usually are in the form of large rectangular rooms having a narrow corridor or "quiet zone" down the center. These anechoic chambers require expensive baffle construction to compensate for reflections from the floor, ceiling and side walls. Work is usually performed by setting up transmitting and receiving equipment at designated positions in the corridor. Long cable lines bring data out of the chamber for recording, and baffles are employed to limit reflections from various items of equipment. The narrowness of the quiet corridor, in which a free-space environment is simuated, and the shape of the chamber itself tend to make the chamber more a liability than an asset for multiple target simulation studies or for operation of sources from more than one direction. Maintenance costs are high since heavy equipment must be carried in and out between setups over expensive absorbent material which must be cleaned or replaced when soiled or damaged. Conventional anechoic chambers often require expensive reworking in order to meet varied performance requirements. Due to the great distances over which transmissions take place in these chambers, all data must be taken at exceedingly low levels of power due to the large space attentuation of the chamber, or else very expensive and high-powered sources of R.F. energy must be employed.

The anechoic chamber of the present invention avoids the many disadvantages of prior anechoic chambers by providing a unique chamber configuration which among other features is compact, adaptable to permit up to 180 degrees of movement in azimuth of the horn transmitting antennae and has a quietness figure of −40 db or better.

Accordingly, it is an object of the present invention to provide a microwave anechoic chamber which has a quietness figure of −40 db or better that is achieved in an unusually small and low cost portable chamber.

It is another object of the present invention to provide a microwave anechoic chamber in which an arcuate quiet zone permits testing over a wide arc from the test receiver position.

It is a further object of the present invention to provide a microwave anechoic chamber which may be used for tracking a radiating source in a simulated multiple-target environment.

It is a still further object of the present invention to provide a microwave anechoic chamber which accommodates operation of radiating sources at various azimuth angles from the receiver without changing the power level at the receiver.

It is a still further object of this invention to provide a compact microwave anechoic chamber in which side lobes may be reflected at reduced amplitudes.

Other objects and many of the attendant advantages of this invention will be readily appreciated as the same becomes better understood by reference to the following detailed description when considered in connection with the accompanying drawings in which like numerals designate like parts and wherein.

Figure 1:
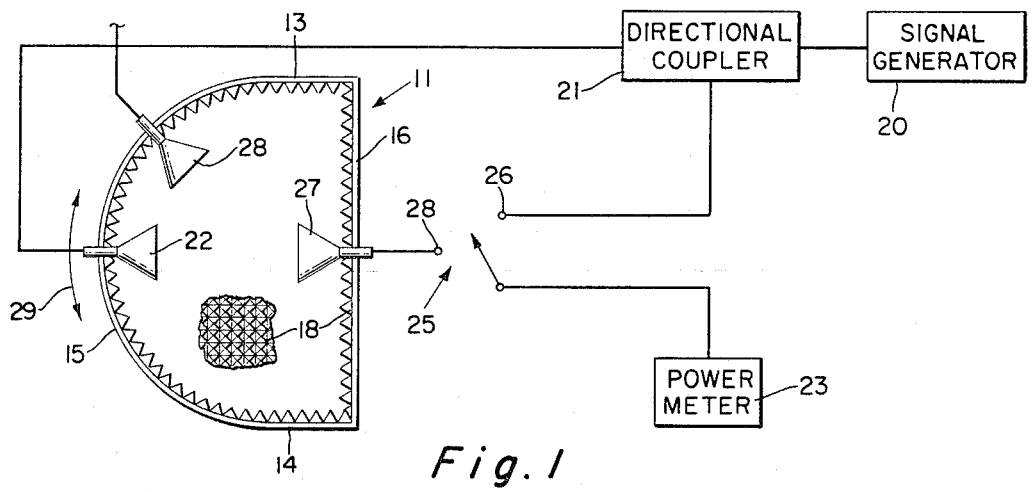
FIG. 1 is a schematic diagram of the anechoic chamber of the present invention connected in a test circuit.

Referring now to FIG. 1, there is shown schematically an anechoic chamber 11 which has generally uniform overall dimensions and in general includes a floor and ceiling and opposing side walls 13 and 14 and front wall 15 and rear wall 16. The interior of the chamber may be lined with any suitable microwave absorbent material 18 having a reflectivity preferably of the order of 40 db.

The dimensions of the chamber 11 are determined principally by the lowest frequency at which it is desired to operate and by the size of the radiating antenna. The radius of curvature of front wall 15 is determined by the expression $2D^2/L$ where L is the minimum wavelength and D is the maximum width of the aperture required for the transmitting horn. At S-band, for example, a 15-db horn having a length of approximately 15 inches and an aperture 8 inches in diameter would require a minimum radius of curvature of about 5 feet for accurate results. This 5-foot radius allows for the thickness of a 40 db absorbent material. The degree of quietness and the versatility of the chamber can be improved significantly by substantially increasing the pertinent dimensions. This, of course, will increase the cost of the chamber.

The test circuit of FIG. 1 includes a signal source such as signal generator 20 connected to a directional coupler 21 through which signals may be directed to transmitter means such as horn 22 or at a reduced value to power meter 23. Single pole, double throw switch 25 is inserted in the circuit to permit determination of the transmitted signal strength, when at terminal 26, and the received signal strength, when at terminal 28. The adaptability of chamber 11 for multiple-target testing is indicated by alternate transmitter horn 28. However, it will become apparent later in the description of this invention that more than two transmitted signals may be introduced simultaneously into the chamber 11, and additionally, that one or more transmitted signals may be introduced at a variety of azimuth bearings without a significant change in the reflectivity of the chamber. Such adaptability for testing at various azimuth angles is indicated schematically by arrows 29.

Figure 2:
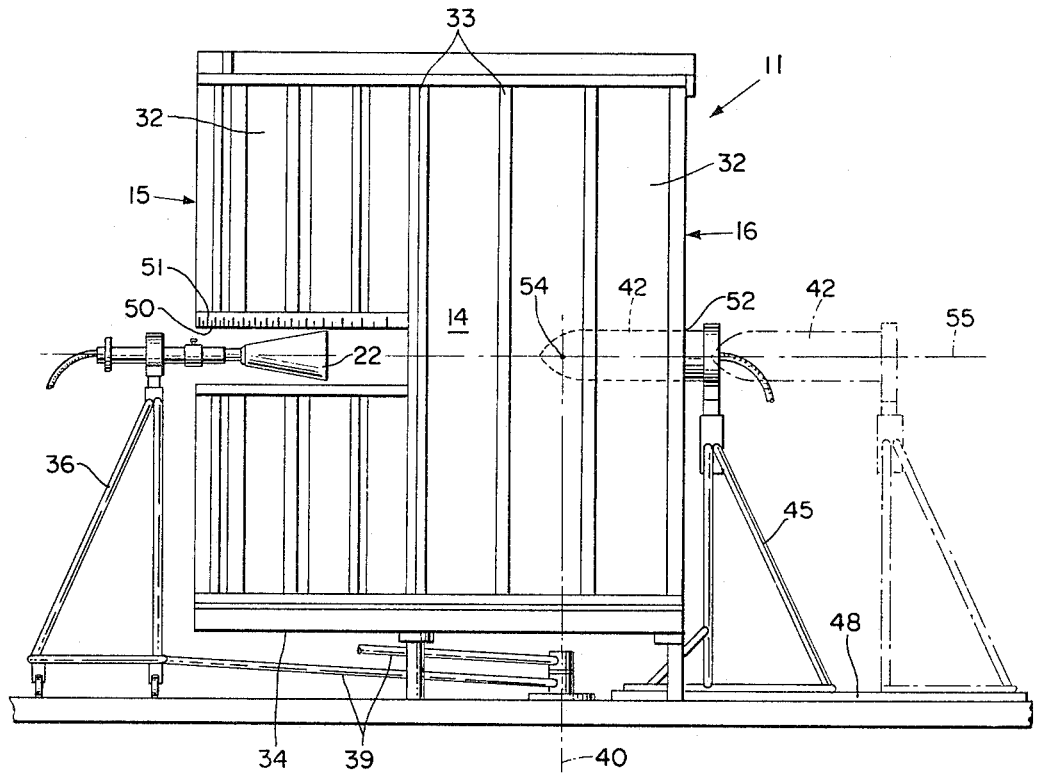
FIG. 2 is a side elevation of one embodiment of the present invention.
Figure 3:
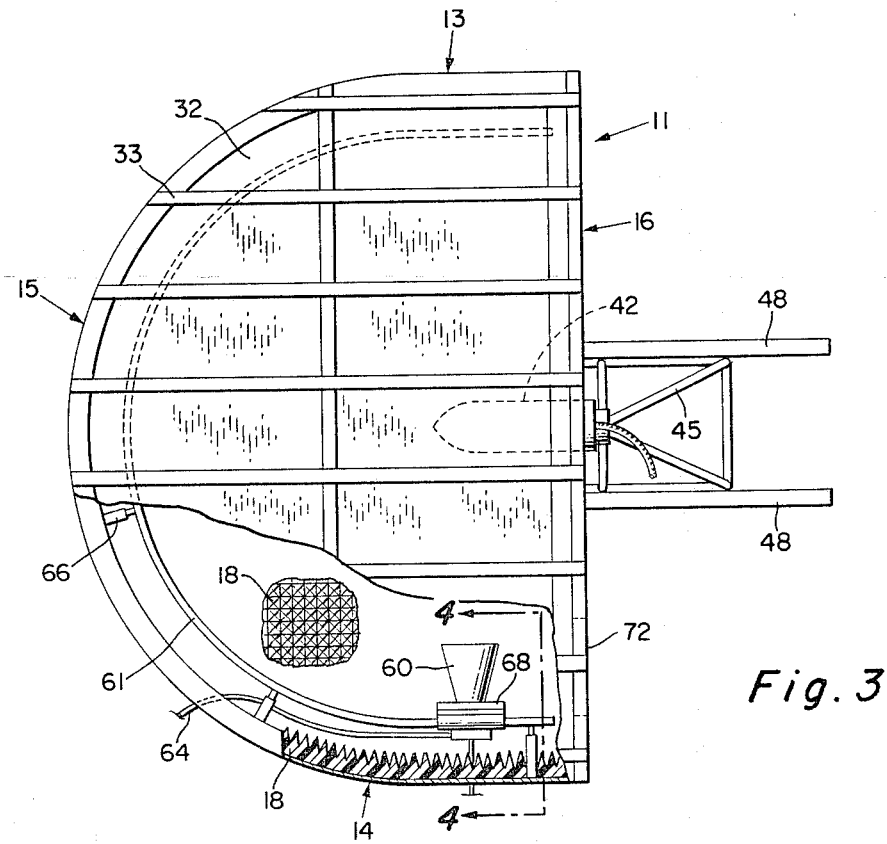
FIG. 3 is a plan view of another embodiment of the present invention.

Two embodiments of the anechoic chamber of the present invention are shown in construction detail in FIGS. 2 and 3 which details include walls 32 of a sturdy composite material such as Masonite laid within a frame which, in the present embodiments may be constructed of 2 x 4 members 33. The chamber may have an elevated floor 34 to permit location thereunder of support means for the transmitter horns such as rods 39 engaging transmitter supporting frame 36 which are disposed for movement about a pivot point 40. The axis of pivot 40 of rods 39 is selected to pass through or intercept the center of a receiver horn such as 27 in FIG. 1 or the antenna (not shown) of a missile whose nose portion is shown in the test position at 42 and in a retracted position indicated in phantom. The receiver means, whether it be a horn or missile nose portion, is supported by a retractable frame 45. Accurate alignment of the receiver is assured by guide rails 48. The frames may be mounted on suitable rollers etc. to permit ease of movement. Curved front wall 15 may be slotted at 50 to permit movement of the transmitting means along a path within the chamber 11 and contains a scale 51 which may be provided for accurate positioning in azimuth. Although the rear wall 16 is shown flat, excellent reflectivity may also be obtained when such wall is convex so that its center portion bows inwardly. Rear wall 16 may be provided with a central opening 52 through which the receiver means may be introduced into the chamber.

It is of particular importance in assembling a chamber such as that of the present invention to carefully align the point about which the transmitter means pivots with the position at which the receiver means will be placed in the quiet zone of the chamber. A plumb bob may be used, suspended through suitable openings in the floor and ceiling of the chamber, to assure highly accurate positioning.

Figure 4:
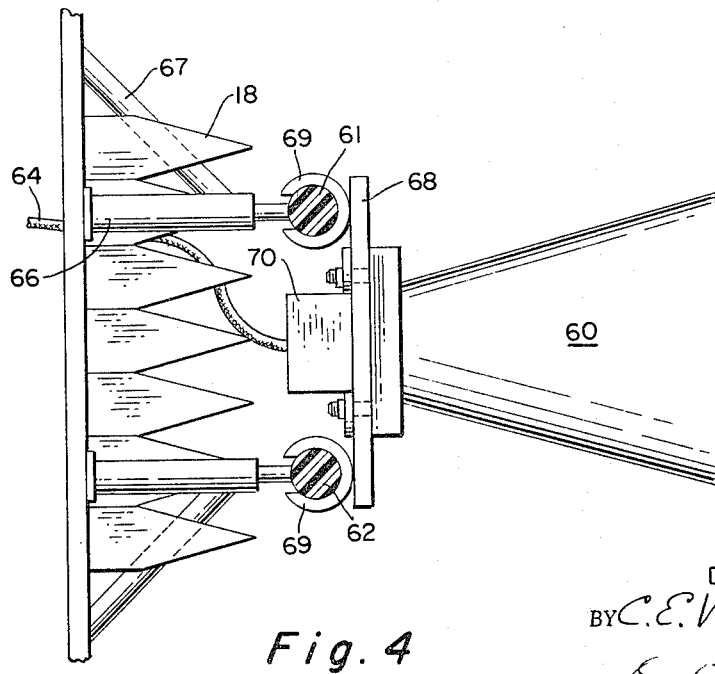
FIG. 4 is an enlarged section taken along a line substantially corresponding to line 4—4 of FIG. 3.

The embodiment of FIGS. 3 and 4 includes the chamber and nose portion support 45 of the embodiment of FIG. 2 but with an alternate means for supporting and positioning the transmitting means within the chamber. In FIG. 3 the chamber top is shown broken away to reveal a transmitting horn and an alternative method of supporting it in place. As shown horn 60 is supported within the chamber on spaced rods 61 and 62 which are preferably of dielectric material such as Plexiglas, plastic or wood. Rods 61 and 62 extend around the entire inner periphery of front wall 15 and side walls 13 and 14 thereby providing a greater scope of movement than permitted in the embodiment of FIG. 1. Cable 64 carries the signals to be transmitted to the transmitter means. In the embodiment shown the cable is led through slot 50, shown in FIG. 2. However, it will be appreciated that in the embodiment of FIG. 3 slots 50 may be eliminated thus enclosing the chamber more completely. In the event there is no slots 50, cable 64 may be led through an opening in the floor or ceiling, not shown, appropriately arranged so as to require a minimum length of cable. Rods 61 and 62 are held in position by posts 66 and brackets 67, both of the latter being secured to the walls of chamber 11 in any suitable manner such as by bolts or screws. Transmitting horn 60 has a base plate 68 affixed to semicircular clips 69 which slidably engage arcuate rods 61 and 62. Suitable electrical connections are provided including a coupling 70 for connecting the inputs carried by cable 64 to horn 60. Where the anechoic chamber is medially slotted as at 50 in FIG. 2, the horns may be laterally positioned by reaching in through the slot. However, where there is no slot the horn 60 and other horns, if employed, may be moved along rods 61 and 62 by access through any suitable door such as is indicated at 72.

In this connection, it is noted that the transmitting means used in the embodiment of FIG. 2 may not be moved in azimuth to the extent that the same may be moved in FIG. 3. The structure of the chamber shown in FIG. 2 is such as to require overhead support of the upper portion thereof should a full sweep from one side of the rear wall to the opposite side be desired.

In constructing this chamber the outer structure may first be formed and the inner surface may then be lined with microwave absorbent material. Such absorbent material is preferably installed last. In the present embodiments, the inner surfaces of the chamber walls are covered with sheets of base material which are glued to the chamber walls in strips spaced to coincide with divisions of the flexible 40 db microwave absorbent material used. As illustrated, the microwave material may be in the form of a series of sponge rubber pyramids impregnated with graphite. The pyramids extend into the chamber and cover all surfaces therein except the opening 52 where the test receiver horn 27 extends through wall 16 and the slot 50 where transmitter horns 22 and 23 enter the chamber. In the present embodiment, the "quiet zone" extends from the test receiver position 54 on a wide arc to the left and right of the boresight line 55 of the chamber. Having a movable transmitting means permits the chamber to be used for tracking a radiating source in a simulated multi-target environment wherein any of several transmitting horns may be inserted in the slot 50. The curved front wall, in association with a pivoted frame supporting the transmitting horns, permits operation of radiating sources at various azimuth angles from the receiver without changing the power level at the receiver. The front wall curvature also helps to divert reflected energy away from the receiver.

The present anechoic chamber provides a direct transmission path which is quite short compared to the width and height of the chamber and which results in lower space-loss for direct main lobe transmissions than the more lengthy conventional chambers. This lower space-loss allows higher signal levels at the receiver with less costly, lower-powered transmitting equipments. Side lobes at the transmitting horn are directed toward the corners thereby resulting in greater space attenuation and greater absorption of these extraneous signals by the microwave absorbent material. These side lobes tend to be reflected at least twice, according to ray theory, before reappearing in the quiet-zone at very greatly reduced amplitudes.

The present invention omits baffles which are used in most conventional anechoic chambers, such omission being possible because of the low ratio of direct to reflected transmission path lengths and because the equipment is kept outside of the chamber. Maintenance costs of the present chamber are significantly reduced over conventional anechoic chambers since in the present chamber it is unnecessary to have personnel walk over the microwave absorbent material to position transmitter and receiver horns and other equipment. Because of its size and simplicity, the initial cost of the present chamber is of the order of 1/10th that of conventional chambers.

The time required to change from one set of test equipment to another is greatly reduced since the equipment is handled from outside of the chamber. The chamber is portable by truck or trailer thereby rendering it rapidly available at different locations and in a time much less than required to construct a chamber.

The present chamber was devised to satisfy a need for a facility for testing a missile guidance section in a multi-target environment. Some of the requirements demanded of the chamber, and accomplished by the present invention, are (1) accurate determination of missile boresight, (2) accurate positioning of target horns or antennae at various angles to the right and left of boresight, (3) maintaining a constant signal level at the test antenna for all target positions, (4) minimizing reflections at the test antenna and (5) providing the foregoing and a rapid change-over at a minimum cost. Keeping the equipments outside of the chamber permits the use of superior absorbent material on the floor which material is usually reserved for special areas in the chamber walls. Such use of better material on the floor improves the overall performance of the chamber. Accurate boresight work is made possible by the use of good quality microwave absorbent material, by maintaining symmetry to the left and right of the test system boresight, and by accurately determining the mechanical boresight position of the system in the chamber. A constant signal level is maintained at the receiver means for all relative angles to the target radiators by swinging the targets from a common pivot point located under the chamber directly below the receiver means. The transmitting means or target radiators are supported on vehicles exterior to the chamber in the FIG. 2 embodiment and are held at a fixed distance from the test antenna by the pivot arms. Having the front wall curved so that the target radiator is always the same distance away as it is moved in azimuth holds constant any effect the wall might have on the pattern radiated.

The front wall curvature has been extended to span a full semicircle so as to minimize the reflections toward the receiver means. Ray tracing techniques have shown that first and second bounce signals are directed away from the receiver means and from the path between transmitter and receiver. This effect is enhanced by using a straight back wall or one that is concave outwards. It is further enhanced by having the height of the chamber greater than the radius of curvature of the front wall. This radius of curvature, as discussed previously, is a function of the lowest frequency at which it is desired to operate and of the size of the radiating antenna. As to the minimum distance between the pivot point and the back wall, such distance is largely determined by the size and shape of the systems to be tested.

In operation, the system under test is supported on frame 45 in such a way that as the frame is moved on a level track, the system antenna is moved in and out of access opening 52 in rear wall 16, the system antenna being positioned for test at the axis of pivot 40 and half way between the floor and the ceiling. Since the rear wall of the chamber should be truly perpendicular with the level floor, alignment of pitch, roll, height and yaw or azimuth is accomplished simply by leveling and squaring the test stand with the chamber and then aligning the transmitting means with the stand one at a time.

It will be recognized that many modifications and variations of the present invention are possible in the light of the above teachings. It is therefore to be understood that within the scope of the appended claims the invention may be practiced otherwise than as specifically described.

I claim:
1. A microwave anechoic chamber for accommodating means for propagating microwaves in a variety of azimuths either simultaneously or successively, and a receiver, comprising:
   a plurality of surfaces assembled to define an enclosure:
   said surfaces being generally arcuate in the enclosure area where microwaves are propagated and generally planar in the enclosure area where the microwaves are received; and
   said propagating means positionable along said arcuate area;
   whereby a quiet zone is provided which extends over a wide arc from the receiver thereby enabling tests to be made from a variety of positions without significant change in the power level at the receiver.

2. The device as defined in claim 1 wherein the transmitting path between a propagating means and the receiver is of the order of one-half the overall dimensions of the enclosure.

3. The device as defined in claim 2 wherein the receiver is adjustable along a line into the enclosure and the propagating means are positionable at points of equal radius from the receiver.

4. A microwave anechoic chamber for accommodating means for propagating microwaves in a variety of azimuths either simultaneously or successively, and a receiver, so as to permit simulation of multiple targets comprising:
   a floor, ceiling and opposite side walls connected to define an enclosure and arranged generally cubical with respect to the line of sight between a centrally positioned propagating means and said receiver;
   said enclosure being arcuate along one side wall and planar along the wall opposite said arcuate side wall;
   microwave absorbent material covering the interior surfaces of said enclosure;
   said planar wall having an opening to removably accommodate said receiver;
   said arcuate side wall having an opening to accommodate a plurality of said propagating means; and
   movable means for positioning said propagating means arcuately with respect to said receiver;
   whereby one or more propagating means may be positioned opposite said receiver and moved in azimuth with respect thereto so as to permit tracking one or several radiating sources at various azimuth angles from the receiver without appreciably changing the power level from each at the receiver.

5. The device as defined in claim 4 wherein said means for propagating microwaves are disposed within said enclosure.

6. The device as defined in claim 5 wherein said enclosure is portable by truck or trailer.

7. A microwave anechoic chamber for accommodating means for propagating microwaves in a variety of azimuths either simultaneously or successively, and a receiver, comprising:
   a floor, ceiling and opposite side walls connected to define an enclosure and arranged generally cubical with respect to a line of sight between one side wall and the wall opposite thereto;
   said enclosure being arcuate along said one side wall and planar along the wall opposite said arcuate side wall;
   microwave absorbent material covering the interior surfaces of said enclosure;
   said planar wall having an opening to removably accommodate said receiver; and
   said arcuate side wall having support means exterior thereto for movably supporting a plurality of propagating means;
   whereby one or more propagating means may be moved in azimuth with respect to said receiver so as to permit testing one or several radiating sources at various azimuth angles from the receiver without changing the power level at the receiver.

8. The device as defined in claim 7 wherein the height of said chamber is greater than the radius of curvature of said arcuate side wall.

9. A microwave anechoic chamber for accommodating means for propagating microwaves in a variety of azimuths either simultaneously or successively, and a receiver, comprising:
   a floor, ceiling and opposite side walls connected to define an enclosure and arranged generally cubical with respect to a line of sight between one side wall and the wall opposite thereto;
   said enclosure arcuate along said one side wall and generally planar along the wall opposite said arcuate side wall;
   microwave absorbent material covering the interior surfaces of said enclosure;
   said generally planar wall having an opening to removably accommodate said receiver;
   said arcuate side wall having support means along the interior surface thereof for movably supporting a plurality of propagating means; and
   said enclosure having a removable section for permitting access into the enclosure to selectively position said propagating means in azimuth with respect to said receiver;

whereby one or more propagating means may be moved in azimuth with respect to said receiver so as to permit testing one or several radiating sources at various azimuth angles from the receiver without changing the power level at the receiver.

10. The device as defined in claim 9 wherein the height of said chamber is greater than the radius of curvature of said arcuate side wall.

11. The device as defined in claim 10 wherein said receiver is positioned directly over the center of curvature of said arcuate wall.

References Cited by the Examiner
UNITED STATES PATENTS

| | | | |
|---|---|---|---|
| 3,100,870 | 8/1963 | Smith | 325—67 |
| 3,113,271 | 12/1963 | Buckley | 325—67 |
| 3,120,641 | 2/1964 | Buckley | 325—67 |

DAVID G. REDINBAUGH, *Primary Examiner.*

JOHN W. CALDWELL, *Examiner.*